US008422679B2

(12) United States Patent
Chowdhary et al.

(10) Patent No.: US 8,422,679 B2
(45) Date of Patent: Apr. 16, 2013

(54) METHOD AND DEVICE FOR SENDING ENCRYPTION PARAMETERS

(75) Inventors: Dipendra M. Chowdhary, Hoffman Estates, IL (US); John P. Belmonte, Schaumburg, IL (US); David G. Wiatrowski, Woodstock, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 994 days.

(21) Appl. No.: 12/253,411

(22) Filed: Oct. 17, 2008

(65) Prior Publication Data
US 2010/0098254 A1   Apr. 22, 2010

(51) Int. Cl.
H04L 29/06 (2006.01)

(52) U.S. Cl.
USPC ........... 380/275; 714/762; 714/758; 370/509; 370/510; 370/512; 370/514; 370/523; 370/524

(58) Field of Classification Search .......................... None
See application file for complete search history.

(56) References Cited

U.S. PATENT DOCUMENTS

| | | | | |
|---|---|---|---|---|
| 4,754,482 | A * | 6/1988 | Weiss | 713/181 |
| 5,991,716 | A * | 11/1999 | Lehtimaki | 704/212 |
| 6,230,120 | B1 * | 5/2001 | Suvanen | 704/201 |
| 6,909,708 | B1 | 6/2005 | Krishnaswamy et al. | |
| 7,203,207 | B2 * | 4/2007 | Hiben et al. | 370/514 |
| 7,729,380 | B2 * | 6/2010 | Wiatrowski et al. | 370/473 |
| 8,306,071 | B2 * | 11/2012 | Hiben et al. | 370/514 |
| 2002/0066013 | A1 * | 5/2002 | Relander et al. | 713/151 |
| 2002/0091975 | A1 | 7/2002 | Redlich et al. | |
| 2004/0186735 | A1 * | 9/2004 | Ferris et al. | 704/500 |
| 2004/0240465 | A1 * | 12/2004 | Newberg et al. | 370/442 |
| 2004/0240480 | A1 * | 12/2004 | Hiben et al. | 370/514 |
| 2005/0015583 | A1 * | 1/2005 | Sarkkinen et al. | 713/150 |
| 2007/0053512 | A1 | 3/2007 | Walter | |
| 2007/0112676 | A1 | 5/2007 | Kontio et al. | |
| 2007/0230407 | A1 * | 10/2007 | Petrie et al. | 370/337 |
| 2008/0008153 | A1 * | 1/2008 | Hiben et al. | 370/344 |
| 2008/0101598 | A1 * | 5/2008 | Dillaway | 380/44 |
| 2008/0167062 | A1 * | 7/2008 | Gilbert et al. | 455/516 |
| 2008/0175158 | A1 * | 7/2008 | Wiatrowski et al. | 370/242 |
| 2008/0192925 | A1 * | 8/2008 | Sachs et al. | 380/29 |
| 2008/0232589 | A1 | 9/2008 | Chamberlain et al. | |
| 2009/0044016 | A1 * | 2/2009 | Vauclair | 713/176 |
| 2010/0153098 | A1 * | 6/2010 | Van den Berghe | 704/211 |

FOREIGN PATENT DOCUMENTS

| | | |
|---|---|---|
| EP | 1693731 A1 | 8/2006 |
| KR | 1020040059146 A | 7/2004 |
| WO | 9702561 | 1/1997 |
| WO | 9735449 | 9/1997 |

OTHER PUBLICATIONS

PCT International Search Report Dated May 7, 2010.
Korean Office Action Dated Jun. 26, 2012 for Counterpart Application.
Russian Office Action Dated Jun. 15, 2012 for Counterpart Application.
Supplementary European Search Report Dated Apr. 2, 2012 for Counterpart Application 09821005.7 PCT/US2009/059503.
"Electromagnetic Compatibility and Radio Spectrum Matters (ERM); Digitall Mobile Radio (DMR) Systems; Part 1: DMR Air Interface (AI) Protocol; ETSI TS 102 361-1"; IEEE, Lis Sophia Antipolis Cedex, France, vol. ERM-TG-DRM, No. V1.4.5; Dec. 1, 2007, XP014040497, ISSN: 0000-0001.

* cited by examiner

Primary Examiner — Nathan Flynn
Assistant Examiner — Michael R Vaughan
(74) Attorney, Agent, or Firm — Valerie M. Davis; Kenneth A. Haas

(57) ABSTRACT

A transmitting device encrypts DMR voice superframes using encryption parameters and sends the encryption parameters in at least one of the voice superframes by: identifying a selected number of bits from a plurality of vocoder frames the voice superframe; replacing each of the identified bits with a corresponding bit of a first encryption parameter; placing at least one encryption parameter in an embedded signaling field of the voice superframe; and transmitting the voice superframe with the encryption parameters to a receiving device. The receiving device extracts the encryption parameters, which can be a key identifier, an algorithm identifier, and an initialization vector for use in decrypting messages from the transmitting device.

20 Claims, 8 Drawing Sheets

US 8,422,679 B2

METHOD AND DEVICE FOR SENDING ENCRYPTION PARAMETERS

TECHNICAL FIELD

The technical field relates generally to wireless communication systems and in particular to sending encryption parameters in an ETSI DMR voice superframe.

BACKGROUND

Over the last few decades, digital two-way radio networks have become widespread. Typically, two-way radios allow users to receive as well as transmit voice or data. To provide interoperability between various digital two-way radio systems and vendors, European Telecommunication Standards Institute (ETSI) has introduced a Digital Mobile Radio (DMR) air interface standard, which specifies various protocols used by the two-way radios at the data link layer (i.e., layer 2) of the well known seven-layer Open Systems Interconnection computer networking model, and which is described in ETSI TS (Technical Specification) 102 361-1 v1.4.5 (2007-12). Reference herein to the ETSI DMR standard includes the current version of the technical specification and all subsequent and future versions.

The ETSI DMR standard specifies a two-slot Time Division Multiple Access (TDMA) structure that transmitting and receiving devices can utilize to send voice and/or data signals. The voice and data signals are transmitted in the TDMA slots in accordance with a general burst format specified in the standard. In addition, the bursts comprising voice signals are transmitted in superframes that are 360 ms long and have six bursts that are designated with the letters "A" through "F".

Moreover, the voice and data messages can be sent in the clear as plain information or can be encrypted and made private so that the data cannot be read or the voice cannot be heard on any device other than one that has the proper parameters needed to decrypt the messages. Accordingly, encryption and decryption (or privacy) is a way to protect communications and keep them private when sending the messages between two devices. However, in the context of this disclosure, privacy does not provide any mechanism to authenticate the devices or users or to protect the integrity of the messages, for instance, to ensure that the messages are decoded in the proper order or that all of the messages were actually received at the receiving device.

The encryption process generally comprises a transmitting device combining certain cryptographic parameters with the plain information to generate protected information that is sent to a receiving device. For encryption processes that use a cryptographic algorithm, such as ARC4, the cryptographic parameters typically include a key, the cryptographic algorithm, and an initialization vector (IV) for the algorithm. Accordingly, in order to properly decrypt the protected information, the receiving device has to know and use the same key, cryptographic algorithm, and IV that were used by the transmitting device.

To make the cryptographic parameters known to the receiving device, the transmitting device can send to the receiving device the cryptographic parameters themselves and/or encryption identifiers (IDs) that identify one or more of the cryptographic parameters. The cryptographic parameters and encryption identifiers are collectively referred to herein as encryption parameters. Thus, when referring to a set of encryption parameters, the set could include one or more cryptographic parameters only, one or more encryption identifiers only, or a combination of both cryptographic parameters and encryption identifiers. Currently, there is no method defined in the DMR standard for transporting encryption parameters.

Thus, there exists a need for a method and device for transmitting encryption parameters that can be implemented in a DMR system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
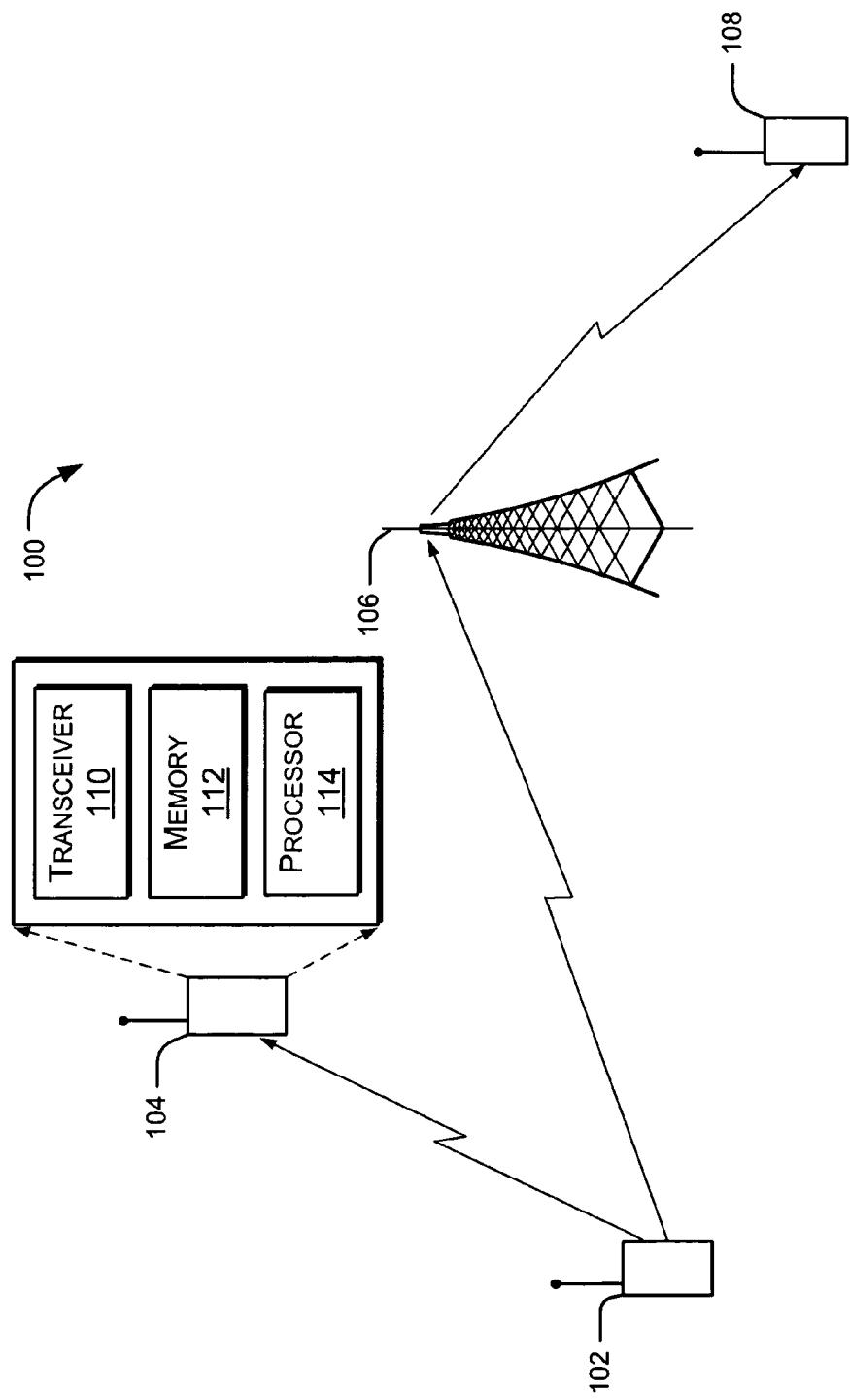
FIG. 1 shows a block diagram of a communication system in accordance with an illustrative embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Device and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a transmitting device encrypts DMR voice superframes using cryptographic parameters that, in one embodiment, include a key, an encryption algorithm, and an IV and sends the encrypted DMR voice superframes to a receiving device. To assist the receiving device in decrypting the DMR voice superframes, the transmitting device: identifies a selected number of bits from a plurality of vocoder frames of a DMR voice superframe; replaces each of the identified bits with a corresponding bit of an encryption parameter (e.g., an IV or modified IV); places at least one encryption parameter (e.g., a key ID and an algorithm ID) in an embedded signalling field of the DMR voice superframe; and transmits the DMR voice superframe with the encryption parameters to the receiving device. The receiving device: extracts the encryption identifiers; extracts a selected number of bits from a plurality of vocoder frames of the DMR voice superframe; arranges the extracted bits to obtain the IV; and uses the extracted IV and encryption identifiers to decrypt the DMR voice superframes.

In one embodiment, the key ID and algorithm ID are sent in the embedded signaling field of the DMR voice superframe F burst and, therefore, does not interfere with the transmission of any other information. In a further embodiment, the bits from the vocoder frames that are replaced with the IV (or modified IV bits) are least significant bits to facilitate minimum distortion of the voice signal. Moreover in another embodiment, the IV, key ID and algorithm ID are sent in every DMR voice superframe to facilitate late entry of a subscriber unit to a voice call with minimum delay. Those skilled in the art will realize that the above-recognized advantages and other advantages described herein are merely illustrative and are not meant to be a complete rendering of all of the advantages of the various embodiments.

Referring now to the drawings, FIG. 1 shows a block diagram of a communication system 100 in accordance with an illustrative embodiment. Communication system 100 is depicted in a very generalized manner. For example, system 100 is illustrated as comprising a single infrastructure device 106 and three wireless communication devices 102, 104, 108, for ease of illustration. However, the teachings herein can be implemented in a system having additional infrastructure devices and wireless communication devices.

Each infrastructure device and wireless communication device is at least equipped with a transceiver (i.e., transmitter and receiver apparatus) 110, a memory 112 and a processing device 114 and is further equipped with any additional components as needed for a commercial embodiment. The transceiver 110, memory 112 and processing device 114 can have any suitable physical implementation and are topologically coupled depending on the particular device implementation. These components are further operatively coupled and can be adapted, arranged, configured, and designed to perform methods in accordance with the teachings herein, for example, as illustratively described by reference to the remaining FIGS. 2 through 8.

As referred to herein, a wireless communication device includes, but is not limited to, devices commonly referred to as access terminals, mobile radios, mobile stations, subscriber units, user equipment, mobile devices, or any other device capable of operating in a wireless environment. Examples of wireless communication devices include, but are not limited to, two-way radios, mobile phones, cellular phones, Personal Digital Assistants (PDAs), laptops and two-way pagers. As used herein, an infrastructure device is a device that is a part of a fixed network infrastructure and can receive information (either control or media, e.g., data, voice (audio), video, etc.) in a signal from a wireless communication device and transmit information in signals to one or more wireless communication devices via a communication link. An infrastructure device includes, but is not limited to, equipment commonly referred to as repeaters, base radios, base stations, base transceiver stations, access points, routers or any other type of infrastructure equipment interfacing a wireless communication device in a wireless environment.

In this illustrative embodiment, system 100 is a DMR system, and the infrastructure device 106 and the wireless communication devices 102, 104, and 108 communicate using the air interface as specified in the DMR standard (as such, device 106 is hereinafter referred to as a base station (or BS), and devices 102, 104, and 108 are hereinafter referred to as mobile stations or (MSs)). In accordance with the DMR standard, the MSs can communicate in "direct mode" or "talkaround mode", wherein the MSs communicate directly with each other outside the control of a BS. MSs 102 and 104 are illustrated in FIG. 1 as communicating in direct mode. MSs can also communicate in "repeater mode", wherein the MSs communicate through a BS. MSs 102 and 108 are illustrated in FIG. 1 as communicating in repeater mode using the BS 106. Transmissions from a BS to a MS in repeater mode are called outbound transmissions, and transmissions from a MS to a BS in repeater mode are called inbound transmissions.

As mentioned earlier, the devices in system 100 communicate using communication links (also referred to herein as channels). The channels comprise physical channels and logical channels. The physical channels are the physical communication resources over which information is sent between the elements within system 100. The physical channels can comprise wired links or wireless links. If the physical channels comprise wireless links, the corresponding physical resource is an allocation of radio spectrum that is partitioned into radio frequency (RF) carriers with each RF carrier partitioned in time into frames and timeslots. The slots for the two TDMA physical channels are labeled channel "1" and channel "2". A DMR burst is a period of RF carrier that is modulated by a media stream and represents the physical channel of a single timeslot. The burst is the smallest standalone unit of TDMA transmission defined in the DMR standard.

A physical channel is required to support a logical channel, which is a logical communication pathway between two or more parties. Logical channels are separated into two categories: traffic channels carrying speech or data information; and control channels carrying signaling, which is specifically concerned with the establishment and control of connections, and with management in the system 100. Signaling from a target to a source is referred to herein as Reverse Channel (RC) signaling. Details of illustrative embodiments will next be described by reference to FIGS. 2 through 8.

Figure 2:
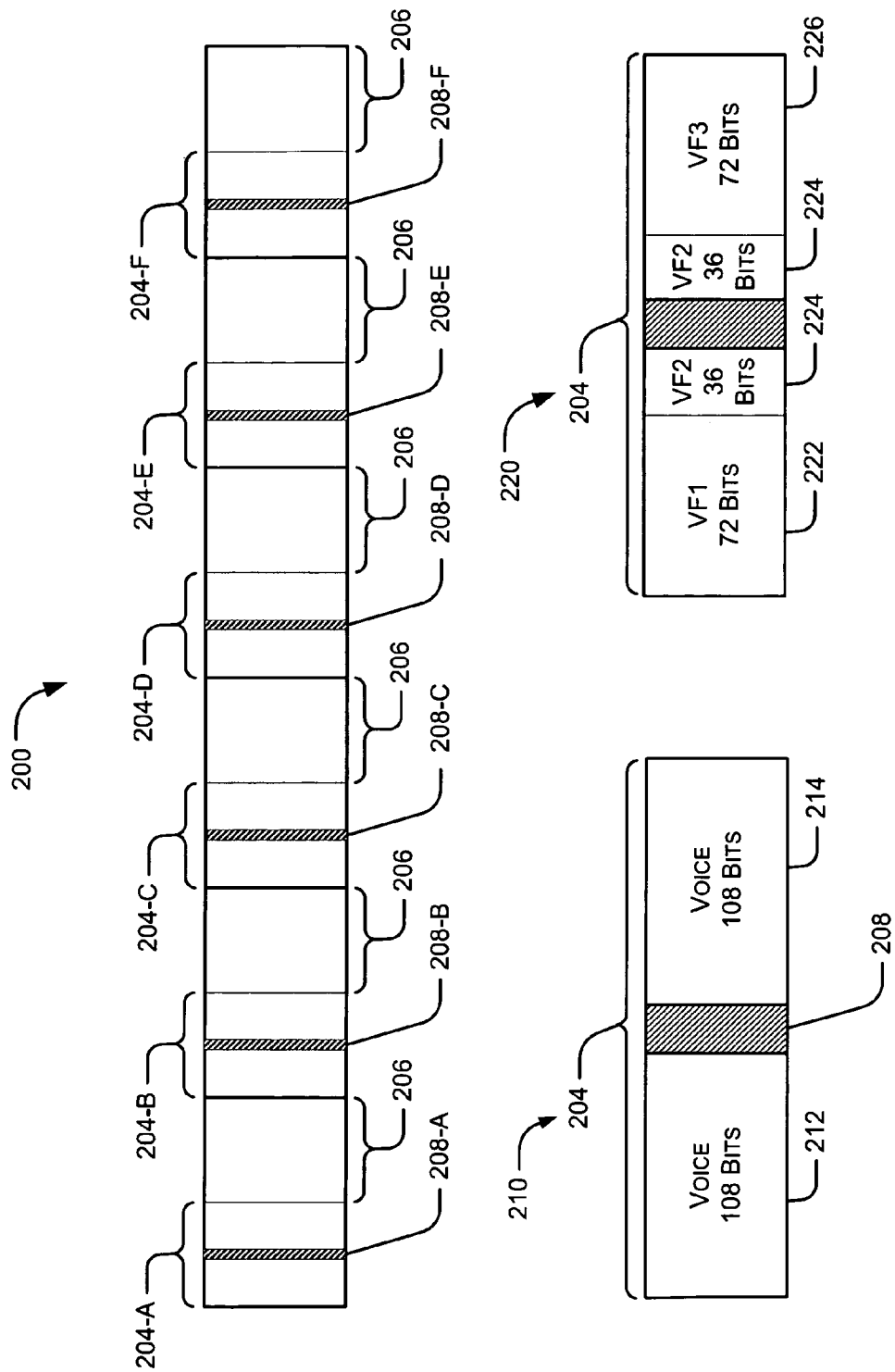
FIG. 2 illustrates embodiments implemented within the framework of a DMR voice superframe, a voice burst within the superframe, and vocoder frames within the voice burst.

FIG. 2 illustrates embodiments implemented within the framework of a DMR voice superframe, a voice burst within the DMR voice superframe, and vocoder frames within the voice burst. A timing diagram for a DMR voice superframe is illustrated at 200. The DMR voice superframe is sent by a transmitting MS to a receiving MS and can be sent in either direct mode or repeater mode. The DMR voice superframe is sent on one of the two channels and comprises six bursts 204, labeled "A" through "F", i.e., 204-A, 204-B, 204-C, 204-D, 204-E, and 204-F. The other channel comprising blocks 206 may be unused or may be in use by other devices in system 100.

Illustrated by reference to 210 is one of the bursts 204 of the DMR voice superframe. The generic burst structure includes two 108 voice bit payload fields 212 and 214 and a 48-bit field 208 in the center of the burst referred to herein as the "embedded signaling" field. The embedded signaling field 208 carries either synchronization or embedded signaling depending on the particular burst within the DMR voice superframe. The defined burst takes 27.5 ms to transmit and may be followed by 2.5 ms of guard time or a Common Announcement Channel (CACH). Thus, one burst is 30 ms; one frame of two contiguous timeslots, referred to as 1 and 2, is 60 ms; and one DMR voice superframe is 360 ms (due to the timing for the other channel).

In one embodiment, Burst A, which marks the beginning of the DMR voice superframe, contains synchronization (for example in the form of known synchronization patterns) in field 208. Bursts B through F may contain embedded signaling such as Link Control (including, but not limited to, source and destination addresses, message type, length), RC signaling, etc., in field 208, and in some implementation scenarios field 208 in at least one of the bursts B through F can be empty (null) or have some unused bits.

As is well known in voice processing, a vocoder is used by a transmitting device to encode digitized speech for purposes of applying forward error correction (FEC), compression, encryption, interleaving, etc. In an embodiment, the transmitting device comprises a 3600 bps vocoder that produces 72-bit frames (including FEC) every 20 ms. Thus, the voice burst 204 carries three 72-bit vocoder frames (including FEC) 222, 224, and 226 plus the 48-bit embedded signaling field as illustrated at 220. FIGS. 3-8 illustrate embodiments, wherein a transmitting device sends encryption parameters (in this case the IV, key ID, and algorithm ID) in the embedded signaling field and in the vocoder frames, which contain encrypted voice bits. However, before describing embodiments of transporting the encryption parameters, a brief discussion is given below of how the encryption parameters are obtained and, in general, used in an illustrative encryption and decryption process.

In an embodiment, the transmitting device uses the cryptographic parameters of a key, a cryptographic algorithm, and an IV to initialize the cryptographic algorithm. The key and cryptographic algorithm may be selected from one of several keys and algorithms stored in and commonly used by both the transmitting and receiving devices. In an illustrative example, the selected key is 40 bits long and is uniquely identified by a key ID, and the algorithm (e.g., ARC4 as is well known in the art) is one that requires an IV and is identified by a unique algorithm ID. Moreover, different keys and algorithms can be used to encrypt voice message versus data messages.

The IV is a block of bits that is used as a seed to the algorithm to produce a unique key stream independent from other key streams produced by the same key. In this illustrative example, the transmitting device generates a 32 bit long IV, which is initialized by a random number that is different for each initialization and for each MS. The initialization can be done either upon power-on or at the beginning of a voice or data call. Moreover, to provide robust cryptographic protection, a different key stream is generated for each DMR packet data unit (PDU) and for each DMR voice superframe. For example, the IV can be updated by applying a Linear Feedback Shift Register (LFSR) on the previous IV. However, in other embodiments, the same IV can be used to generate the key stream for a number of DMR voice superframes (or PDUs) or once for every call, but these methods provide less cryptographic protection. It should also be noted that, the key and IV bitwise lengths and the particular algorithm provided for herein are given merely as examples and are not meant to limit the scope of the teachings herein. Accordingly, any suitable key, algorithm, IV, or other relevant encryption parameter may be used depending on the particular encryption methodology implemented.

Returning to the description on the illustrative encryption process, to protect the plain information, the transmitting device selects a key and concatenates the key with the IV to use in initializing the cryptographic algorithm, which is used to generate a key stream byte by byte at the output of the algorithm. The key stream is combined with the plain information using a logical exclusive OR operator (i.e., XOR) to generate protected information, which is sent to a receiving device. To decrypt the protected information, the receiving device has to generate the same key stream as was generated in the transmitting device, and XOR the key stream with the protected information to obtain the plain information that can be read or heard by a user of the receiving device. However, in order to generate the same key stream, the receiving device has to use the same key, cryptographic algorithm, and IV as was used in the transmitting device. The remaining FIGS. 3-8 provide for an illustrative embodiment for a transmitting device to transport encryption parameters to a receiving device in a DMR voice superframe and for the receiving device to extract those encryption parameters to use in the decryption process.

Figure 3:
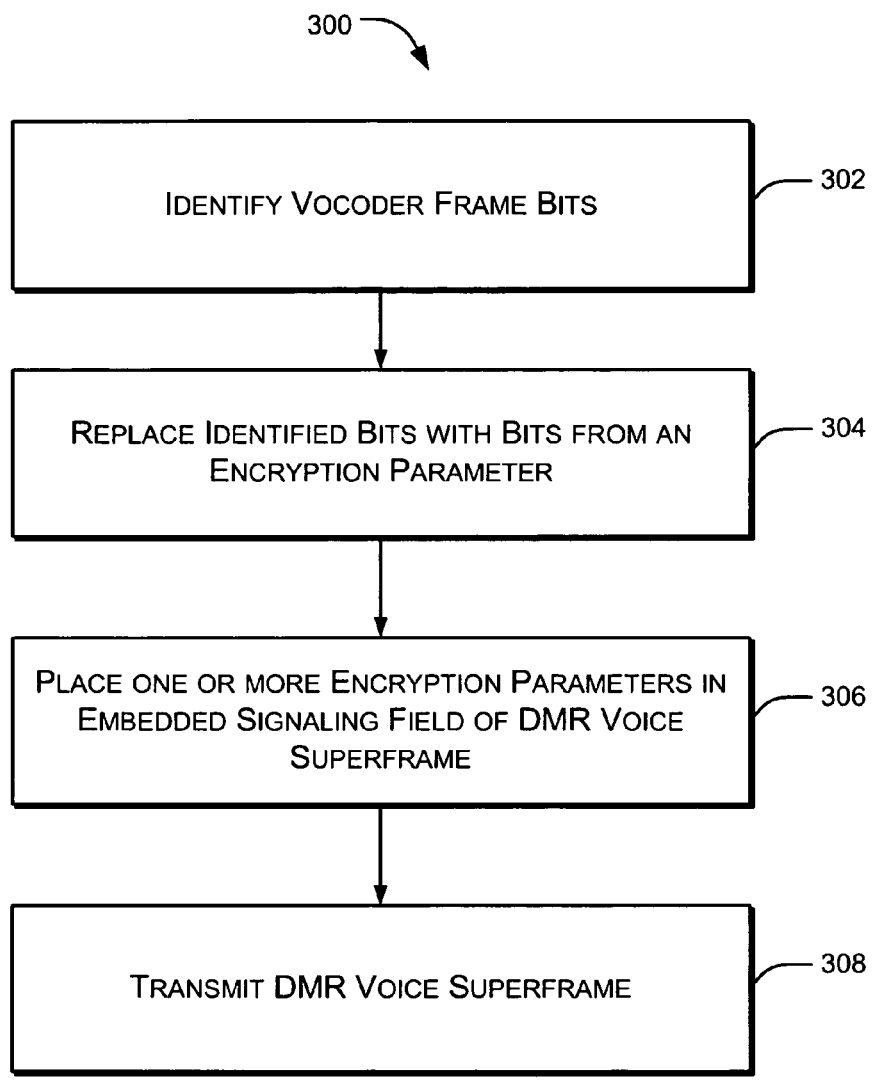
FIG. 3 shows a flow diagram of a method for transmitting encryption parameters in a DMR voice superframe in accordance with an illustrative embodiment.

Turning now to FIG. 3 in which is shown a flow diagram of a method 300 for transmitting encryption parameters in a DMR voice superframe in accordance with an illustrative embodiment. In general, the encryption parameters are transported in a DMR voice superframe within an embedded signaling field and by replacing vocoder frame bits with bits of one or more of the encryption parameters.

More particularly, at 302, the transmitting device identifies a selected number of bits from a plurality of vocoder frames. Any bits may be identified and replaced. However, identifying and replacing only least significant bits are advantageous in that this has the least effect on, or in other words causes minimum distortion of, the audio heard at the receiving device. As used herein, the phrase "least significant bits" are those vocoder bits that have the least noticeable impact on audio quality regardless of bit order. Thus, as used in this sense, least significant bits do not just simply refer to the bits having the lowest bit numbering according to how all of the vocoder bits are numbered.

The transmitting device replaces (304) at least some of the identified bits with corresponding bits of at least one encryption parameter. In the embodiments described below by reference to FIGS. 4 and 5, the identified bits are replaced with corresponding bits of the IV and, more particularly, each of the identified bits are replaced with corresponding bits of a modified IV, which are combined with error control bits (i.e., error detection parity bits and/or forward error detection parity bits). However, in another embodiment, the identified bits could be replaced with corresponding bits of a truncated or shortened IV. In yet another embodiment, the identified vocoder frame bits can be replaced with bits of other encryption parameters such as the key, key ID, algorithm ID, etc, in addition to or alternatively to the IV or modified IV.

The transmitting device, at 306, also places one or more encryption parameters in an embedded signaling field in the DMR voice superframe. Any encryption parameters (or portion thereof) can be placed in one or more embedded signaling fields of any voice burst. However, so as not to interfere with the transmission of other information and signaling in the DMR voice superframe, smaller sized encryption parameters such as encryption identifiers (e.g., the key ID and the algorithm ID) are placed into an embedded signaling field in a burst having bits that are not otherwise being used with other information or signaling, such as in the F burst. An illustrative embodiment of placing encryption parameters within an embedded signaling field is described by reference to FIGS. 6 and 7. The transmitting device then transmits (308) the DMR voice superframe with the encryption parameters to one or more receiving devices.

Figure 4:
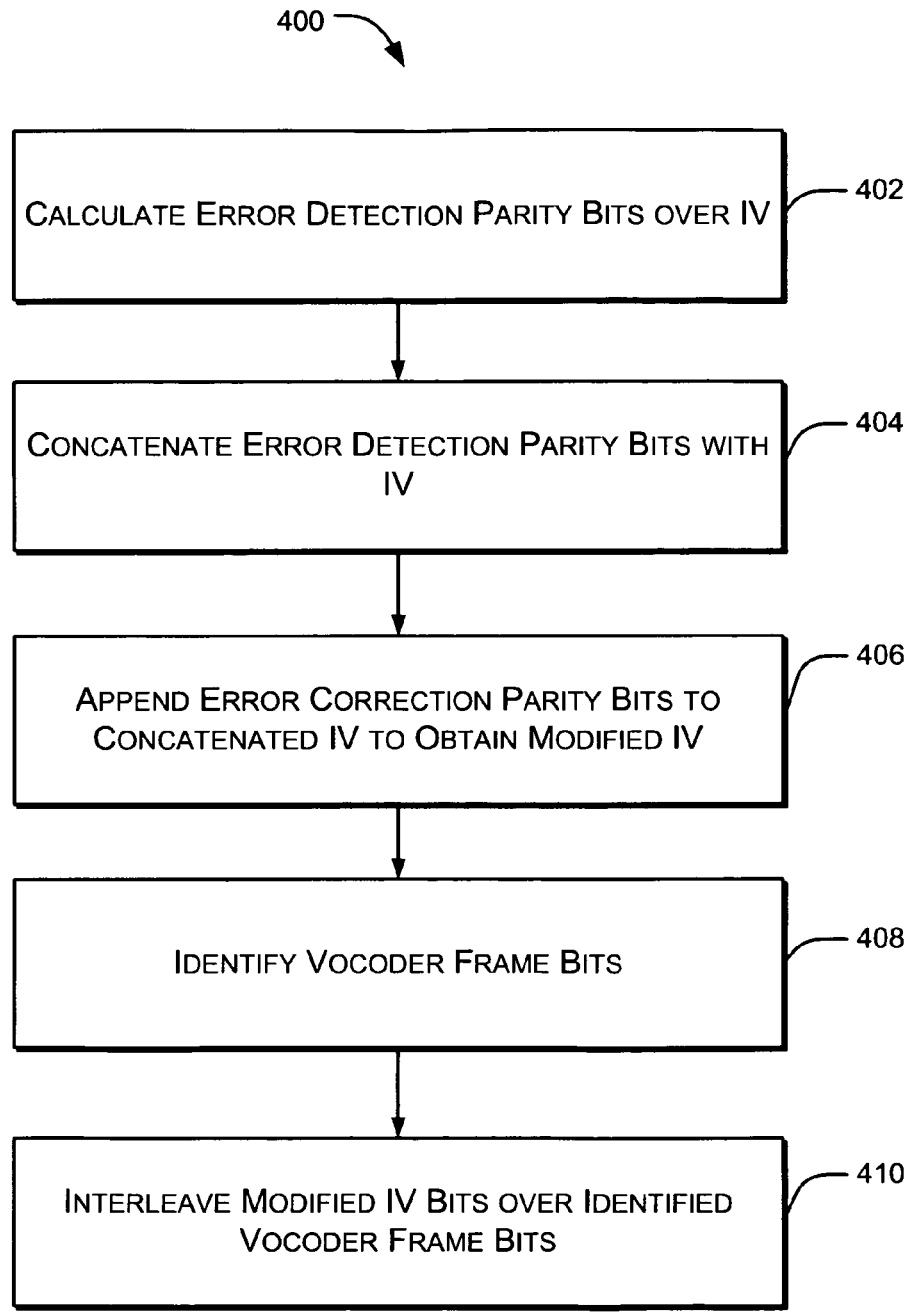
FIG. 4 shows a flow diagram of a method of placing an IV within a DMR voice superframe in accordance with an illustrative embodiment.

Turning now to FIG. 4, shown therein is a flow diagram of a method of placing a modified IV within a DMR voice superframe in accordance with an illustrative embodiment. FIG. 4 will be described in conjunction with FIG. 5 to show a specific example of each of selected vocoder frame bits being replaced by corresponding bits of the modified IV. Upon generating an IV (502), the transmitting device calculates (402) error detection parity bits over the IV, which are concatenated (404) with the IV to generate a concatenated IV. Any error detecting techniques can be used to generate the error detection parity bits including, but not limited to, hash functions, simple parity, Checksum, etc. However, in the embodiment illustrated by reference to FIG. 5, the transmitting device calculates a cyclic redundancy check (CRC) check over the IV to generate the error detection parity bits 504 that are appended to the IV 502. In one illustrative example, the CRC is calculated using polynomial arithmetic using a CRC generator polynomial, such as $x^4+x+1$, to generate a 4-bit CRC, but any other suitable method to calculate the CRC can be used.

Figure 5:
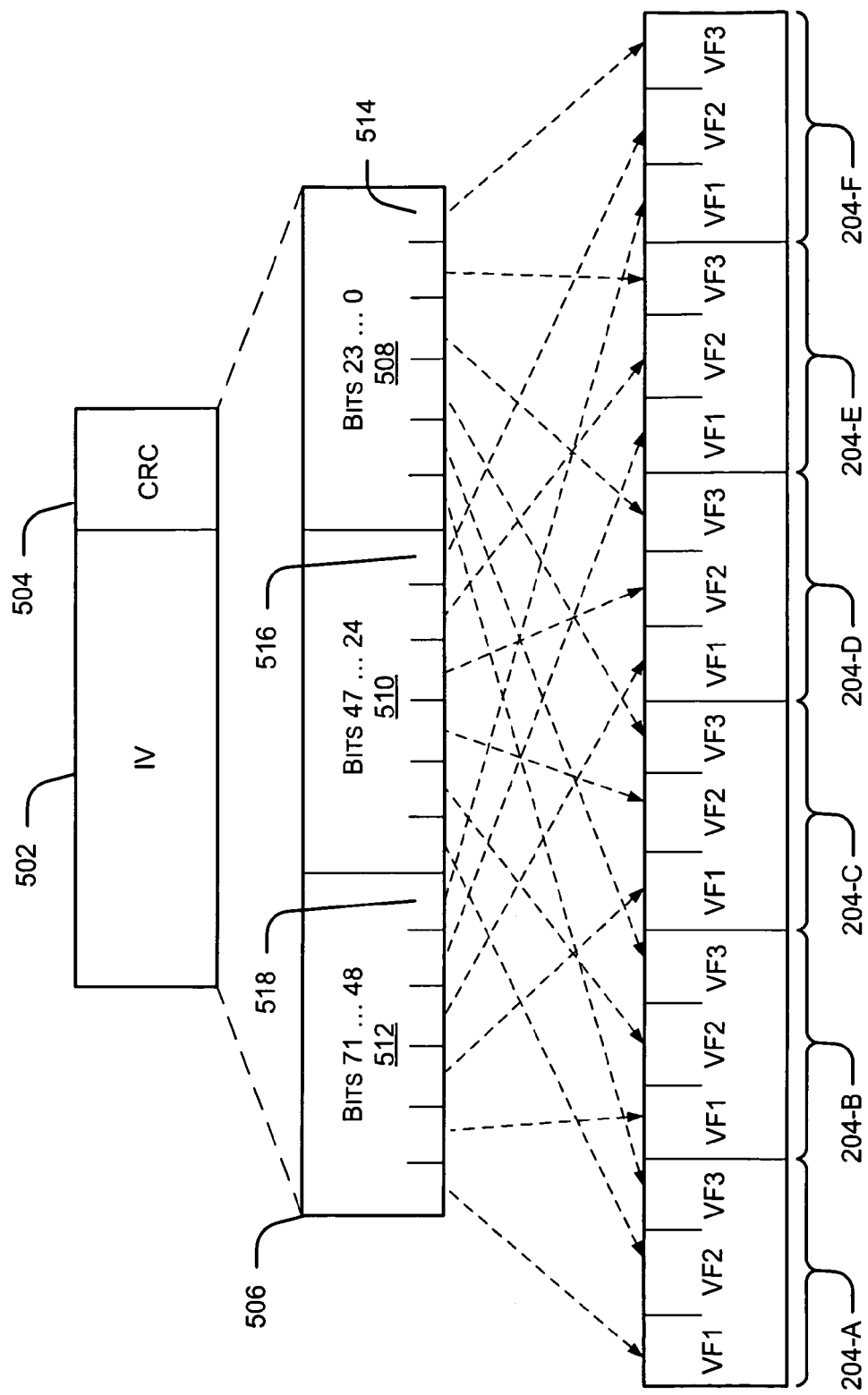
FIG. 5 shows selecting bits from vocoder frames in a DMR voice superframe and replacing them with modified IV bits in accordance with an illustrative embodiment.
Figure 6:
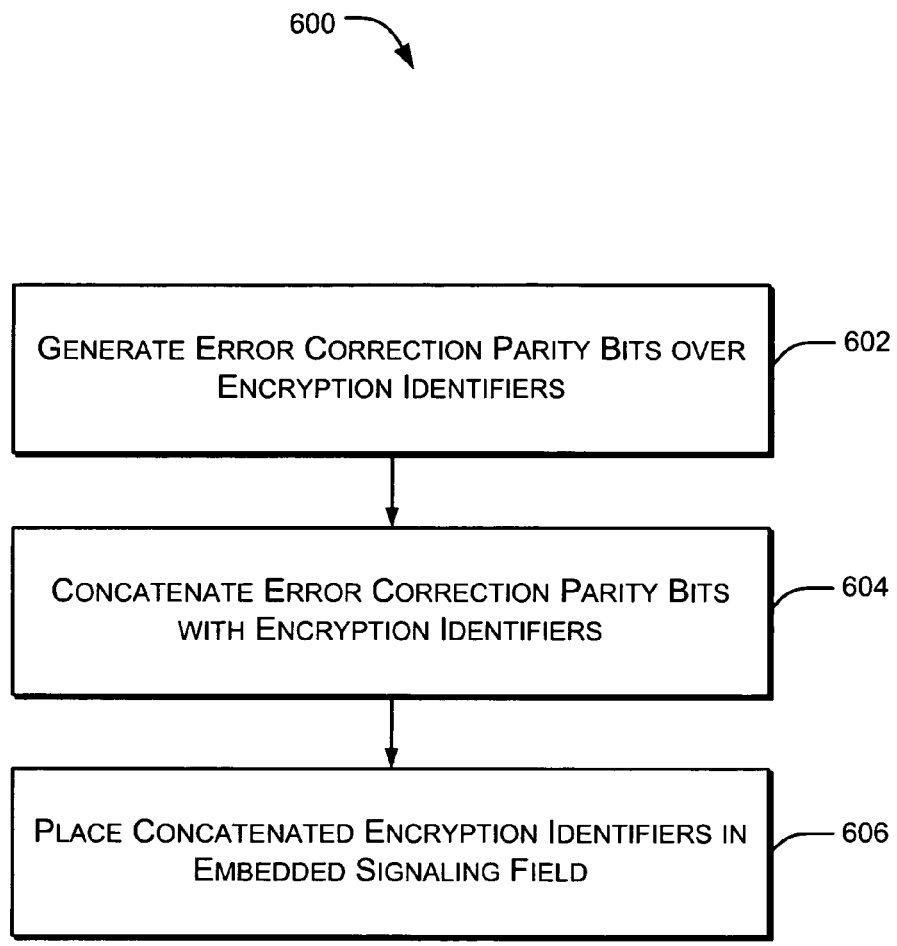
FIG. 6 shows a flow diagram of a method for placing encryption identifiers in a DMR voice superframe in accordance with an illustrative embodiment.

At 406, the transmitting device appends error correction parity bits to the concatenated IV to generate the modified IV using any suitable error correction technique including, but not limited to, use of Automatic repeat-request (ARQ) techniques, a Hamming code, a Golay code, a Reed-Solomon code, to name a few. In the embodiment illustrated by reference to FIG. 5, the transmitting device splits the 36 bit concatenated IV into three segments and applies an extended (24, 12, 8) Golay code to the concatenated IV, to append 36 forward error correction (FEC) parity bits and, thereby, generate 72 bits of modified IV 506. More or fewer than 72 bits could be generated if using a different error correcting technique. The transmitting device divides the modified IV into three equal segments 508, 510, and 512 of 24 bits to be transported in the vocoder frames of the DMR voice superframe. As shown in FIG. 5, segment 508 comprises bits 0 to 23; segment 510 comprises bits 24 to 47; segment 512 comprises bits 48 to 71. Dividing the modified IV into equal segments of 24-bits is not required to implement the teachings herein. The modified IV need not be divided at all or could be divided into a different number of segments having an equal or unequal number of bits.

The transmitting device identifies (408) a selected number of bits from the vocoder frames and replaces these bits with the 72 bits of modified IV. In an illustrative embodiment, the transmitting device identifies four least significant bits from each of the three vocoder frames (VF1, VF2, VF3) in each of the six bursts (204-A to 204-F) of the DMR superframe shown in FIG. 2 and interleaves (410) the modified IV bits into the positions of the identified vocoder frame bits. In case the modified IV is longer or shorter than 72 bits, more or fewer bits can be identified from the vocoder frames to transport the IV. Using certain 3600 bps vocoders, up to six bits can be selected from the vocoder frames with minimum distortion to the transmitted voice signal.

The bits from each of the modified IV segments 508, 510, 512 could be sequentially placed into the positions of the identified vocoder bits. However, in this illustrative example, the modified IV are interleaved into the vocoder frame bit positions in order to arrange the IV bits in a non-contiguous way to protect the IV against burst errors during transmission. The modified IV bits can be interleaved bit by bit, but in this example, small blocks of bits (e.g., four bit blocks in this case) are interleaved in the positions of equal sized blocks of identified vocoder frame bits. For example, block 514 of the segment 508 is placed in vocoder frame (VF3) of the burst 204-F. Block 516 of the segment 510 is placed in the vocoder frame (VF2) of burst 204-F; and block 518 of the segment 512 is placed in the vocoder (VF1) of the burst 204-F. Similarly, the next four-bit block from each segment 508, 510, 512 is placed in the vocoder frames VF3, VF2 and VF1 of burst 204-E, and so on.

Figure 7:
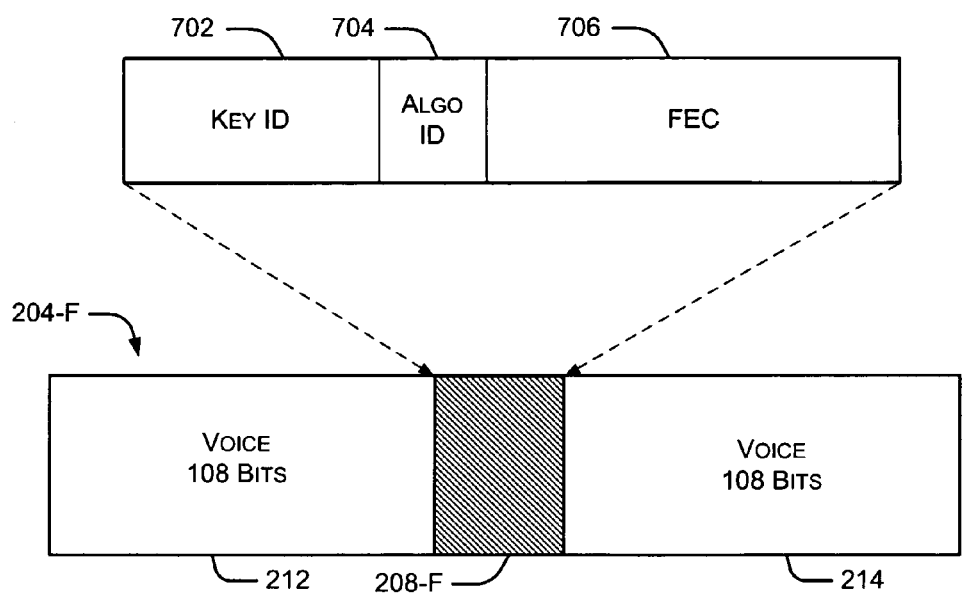
FIG. 7 shows placement of the encryption identifiers in an embedded signaling field of a DMR voice burst in accordance with an illustrative embodiment.

As mentioned above FIGS. 6 and 7 provide for an illustrative example of placing encryption parameters (in this case a key ID 702 and an algorithm ID 704) in the DMR voice superframe. In one embodiment, the key ID is 8-bits long, and the algorithm ID is 3-bits long, although the length of the encryption identifiers can vary. More particularly, in accordance with a method 600, the transmitting device generates (602) error correction parity bits over one or more of the encryption identifiers and concatenates (604) the error correction parity bits with the encryption identifiers. As illustrated in FIG. 7, 21 FEC parity bits 706 are generated over the key ID 702 and algorithm ID 704 and then appended to the key and algorithm IDs. The error correction parity bits can be generated using any suitable error correction techniques including any one of those mentioned above to thereby generate the same number, more, or fewer error correction parity bits, or the error correction parity bits could be calculated over only the key ID or the algorithm ID. Moreover in another embodiment, the transmitting device could calculate error detection parity bits (e.g., using CRC, Checksum, simple parity, etc.) over one or more of the encryption identifiers before generating the error correction parity bits or instead of generating the error correction parity bits.

In this illustrative implementation, the transmitting device places (606) the key ID 702, algorithm ID 704 and concatenated FEC parity bits 706 into the embedded signaling field 208-F of the F burst 204-F of the DMR voice superframe shown in FIG. 2. As mentioned above, placing encryption parameters in the F burst is advantageous because, at present, the embedded signaling field is null. However, the encryption parameters could be placed in the embedded signaling field of any one or more of the bursts in the DMR voice superframe. Moreover, the transmitting device could place the encryption parameters in a single embedded signaling field throughout the entire voice call (comprising a plurality of DMR voice superframes) or periodically place the encryption parameters in several embedded signaling fields during the call. However, to best facilitate late entry by a receiving device to a voice call after initial headers having the encryption parameters have been sent, it is further advantageous for the transmitting device to place the encryption parameters in every DMR voice superframe of the call.

Figure 8:
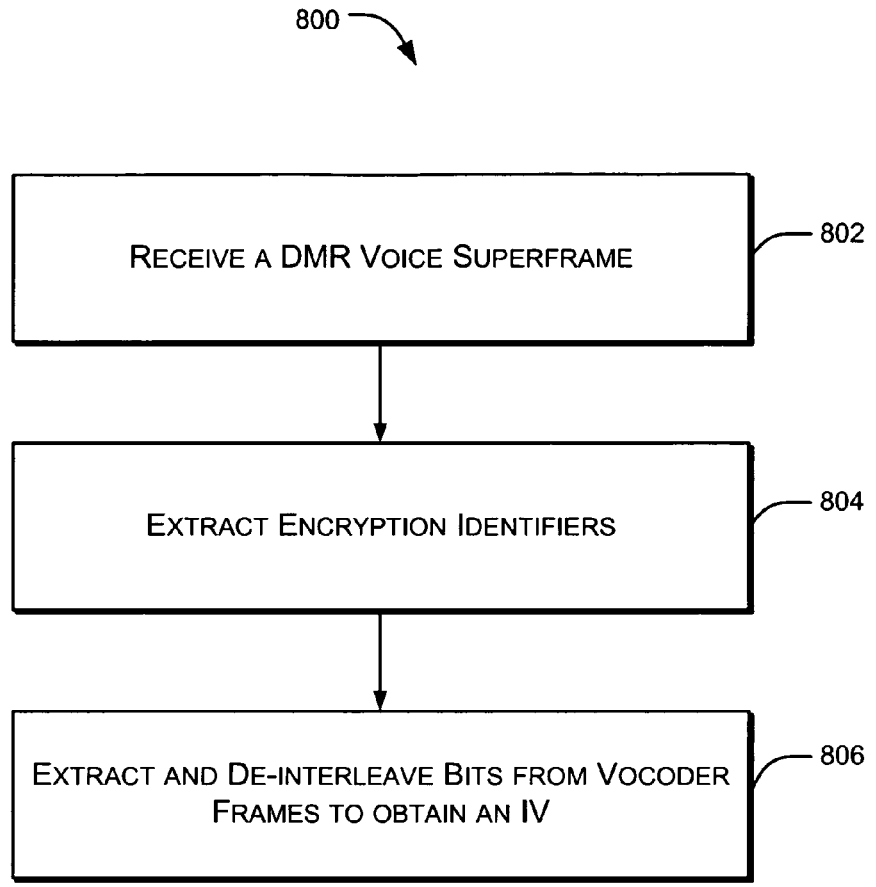
FIG. 8 shows a flow diagram of a method for receiving encryption parameters in a DMR voice superframe in accordance with an illustrative embodiment.

FIG. 8 shows a flow diagram of a method 800 for receiving encryption parameters in a DMR voice superframe in accordance with an illustrative embodiment. Upon receiving (802) voice transmissions from a transmitting device, a receiving device detects that the transmissions are encrypted. For instance, in one embodiment the receiving device detects that a privacy bit is set in a Voice Link Control (LC) header, which indicates that the receiving device needs to extract the encryption parameters in order to decrypt the voice transmissions. In addition, or in the alternative, a bit could be set in embedded LC signaling during the voice transmission and/or in a Terminator with LC at the end of the voice transmission to indicate to the receiving device to extract the encryption parameters from the DMR voice superframes. Other methods of indicating to the receiving device to extract the encryption parameters could also be implemented without detracting from the scope of the teachings herein.

Accordingly, the receiving device extracts (804) at least one encryption parameter from an embedded signaling field of the DMR voice superframe 200. In this case, the receiving device extracts the key ID 702 and algorithm ID 704 from the embedded signaling field of the F burst and applies the FEC bits 706 to these encryption identifiers to correct any errors, if present. The receiving device also extracts and de-interleaves (806) bits from the vocoder frames of the DMR voice superframe to obtain the IV.

More particularly, the receiving device removes the four least significant bits (four-bit blocks) from each of the eighteen vocoder frames in the DMR voice superframes and de-interleaves the four bit blocks to obtain the 72 bit modified IV, which includes the FEC parity bits. In a different implementation, a subset of the four-bit blocks could be removed from the vocoder frames to obtain the IV. FEC is applied over the error-protected IV to obtain the 32 bit IV and four bit CRC. Upon verifying the 4 bit CRC, the receiving device selects the appropriate key as identified by the key ID and the appropriate algorithm as identified by the algorithm ID.

In this case, the algorithm is ARC4, which uses the key concatenated with the IV to generate the same key stream as was generated in the transmitting device. To obtain the plain voice payload of the DMR voice superframe, the receiving device XORs the encrypted part of the payload with the key stream. Method 800 can be performed for each DMR voice superframe, or once the encryption parameters are obtained in a particular DMR voice superframe, they can be used to decrypt that DMR superframe. For each subsequent DMR voice superframe, the receiving device can simply update the IV using the LFSR of the previous IV to decrypt the subsequent DMR voice superframe.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for sending encryption parameters described herein. The non-processor circuits may include, but are not limited to, a radio receiver, a radio transmitter, signal drivers, clock circuits, power source circuits, and user input devices. As such, these functions may be interpreted as steps of a method to perform the sending of encryption parameters described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method for sending encryption parameters in a European Telecommunications Standards Institute Digital Mobile Radio (DMR) voice superframe, the method comprising:

identifying a selected number of bits from a plurality of voice frames of the DMR voice superframe;

replacing at least some of the identified bits of the voice frames of the DMR superframe with a corresponding bit of a first encryption parameter;

placing at least a second encryption parameter in an embedded signaling field of the DMR voice superframe; and transmitting the DMR voice superframe, which includes the encryption parameters.

2. The method of claim 1, wherein the selected number of bits from the plurality of voice frames comprises a selected number of least significant bits.

3. The method of claim 2, wherein the selected number of least significant bits comprises four least significant bits identified from each of the plurality of voice frames in the DMR voice superframe.

4. The method of claim 1, wherein the first encryption parameter comprises an initialization vector (IV).

5. The method of claim 4, wherein replacing at least some of the identified bits with a corresponding bit of the IV comprises:

generating a modified IV by combining the IV with at least one of error detection parity bits or forward error correction parity bits; and replacing each of the identified bits with a corresponding bit of the modified IV.

6. The method of claim 5, wherein generating the modified IV comprises:

calculating a Cyclic Redundancy Check (CRC) for the IV;

concatenating the CRC with the IV to generate a concatenated IV;

adding forward error correction (FEC) parity bits to the concatenated IV to generate the modified IV.

7. The method of claim 4, wherein replacing each of the identified bits comprises interleaving the bits of the IV in positions of the identified bits.

8. The method of claim 1, wherein placing the at least a second encryption parameter in the embedded signaling field comprises positioning at least one encryption identifier in the embedded signaling field of Burst F of the DMR voice superframe.

9. The method of claim 1, wherein the at least a second encryption parameter comprises at least one of an encryption key identifier, an encryption algorithm identifier, the encryption key identifier combined with error control bits, the encryption algorithm identifier combined with error control bits, or the encryption key identifier and the encryption algorithm identifier combined with error control bits.

10. The method of claim 9, wherein the error control bits comprises at least one of error detection parity bits or forward error correction (FEC) parity bits.

11. A method for receiving encryption parameters in a European Telecommunication Standards Institute Digital Mobile Radio (DMR) voice superframe, the method comprising:

receiving the DMR voice superframe comprising voice frames;

extracting a first encryption parameter from an embedded signaling field of the received DMR voice superframe;

extracting a selected number of bits from a plurality of voice frames of the DMR voice superframe; and arranging the extracted bits to obtain a second encryption parameter.

12. The method of claim 11, wherein the first encryption parameter is extracted from the embedded signaling field of Burst F of the DMR voice superframe.

13. The method of claim 11, wherein the first encryption parameter comprises at least one of an encryption key identifier, an encryption algorithm identifier, the encryption key identifier combined with error control bits, the encryption algorithm identifier combined with error control bits, or the encryption key identifier and the encryption algorithm identifier combined with error control bits.

14. The method of claim 13, wherein the error control bits comprises at least one of error detection parity bits or forward error correction (FEC) parity bits.

15. The method of claim 13 further comprising decrypting the received DMR superframe using a key selected based on a key ID and an encryption algorithm selected based on the algorithm ID.

16. The method of claim 11, wherein the selected number of bits from the plurality of voice frames comprises a selected number of least significant bits.

17. The method of claim 16, wherein the selected number of least significant bits comprises four least significant bits extracted from each of the plurality of vocoder frames of the DMR voice superframe.

18. The method of claim 11, wherein the second encryption parameter comprises an IV.

19. The method of claim 18 further comprising decrypting the received DMR superframe using the IV.

20. A device for sending encryption parameters in a European Telecommunications Standards Institute Digital Mobile Radio (DMR) voice superframe, the device comprising:

a processing device for:

identifying a selected number of bits from a plurality of voice frames of the DMR voice superframe;

replacing at least some of the identified bits within the voice frames of the DMR voice superframe with a corresponding bit of an initialization vector (IV); and placing at least one encryption identifier in an embedded signaling field of the DMR voice superframe; and a transceiver coupled to the processing device for transmitting the DMR voice superframe, which includes the IV and encryption identifiers.

* * * * *